US011457125B2

(12) United States Patent
Lopez Alvarez et al.

(10) Patent No.: US 11,457,125 B2
(45) Date of Patent: Sep. 27, 2022

(54) THREE-DIMENSIONAL PRINTER COLOR MANAGEMENT

(71) Applicant: Hewlett-Packard Development Company, L.P., Spring, TX (US)

(72) Inventors: Miguel Angel Lopez Alvarez, Vancouver, WA (US); Morgan T. Schramm, Vancouver, WA (US); Xin Cheng, Vancouver, WA (US); Jay S. Gondek, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 295 days.

(21) Appl. No.: 16/769,218

(22) PCT Filed: Dec. 20, 2017

(86) PCT No.: PCT/US2017/067745
§ 371 (c)(1),
(2) Date: Jun. 2, 2020

(87) PCT Pub. No.: WO2019/125451
PCT Pub. Date: Jun. 27, 2019

(65) Prior Publication Data
US 2020/0368971 A1  Nov. 26, 2020

(51) Int. Cl.
*H04N 1/60* (2006.01)
*B33Y 50/00* (2015.01)

(52) U.S. Cl.
CPC ............ *H04N 1/6058* (2013.01); *B33Y 50/00* (2014.12); *H04N 1/6033* (2013.01); *H04N 1/6097* (2013.01)

(58) Field of Classification Search
None
See application file for complete search history.

(56) References Cited

U.S. PATENT DOCUMENTS 7,991,498 B2   8/2011  Kritchman
9,020,627 B2   4/2015  Kritchman
(Continued)

FOREIGN PATENT DOCUMENTS

CN          105415679       3/2016
WO     WO-2016186236 A1   11/2016

OTHER PUBLICATIONS

International Search Report and Written Opinion dated Dec. 27, 2018, PCT Patent Application No. PCT/US2017/067745, filed Dec. 20, 2017, Federal Institute of Industrial Property, Moscow, Russia, 7 pages.

(Continued)

*Primary Examiner* — Scott A Rogers
(74) *Attorney, Agent, or Firm* — Mannava & Kang

(57) ABSTRACT

In some examples, with respect to three-dimensional printer color management, three-dimensional printer native space coordinates of a three-dimensional printer may be mapped to three-dimensional printer printing agent space coordinates of the three-dimensional printer. The three-dimensional printer printing agent space coordinates may be mapped to color space coordinates. The color space coordinates may be mapped to two-dimensional printer printing agent space coordinates of a two-dimensional printer. The two-dimensional printer printing agent space coordinates may be mapped to two-dimensional printer native space coordinates of the two-dimensional printer. A color management protocol of the two-dimensional printer may be utilized, based on the mapping of the three-dimensional printer native space coordinates to the two-dimensional printer native space coordinates, for the three-dimensional printer to print a three-dimensional object.

15 Claims, 9 Drawing Sheets

(56) References Cited

U.S. PATENT DOCUMENTS

| | | |
|---|---|---|
| 9,738,033 B2 | 8/2017 | Kritchman |
| 2011/0122230 A1 | 5/2011 | Boisson |
| 2015/0239270 A1 | 8/2015 | Attia |
| 2021/0382666 A1* | 12/2021 | Maestro Garcia ........ G01J 3/46 |

OTHER PUBLICATIONS

Krassenstein, E., "First Full Color Consumer Level Stereolithography & Fdm 3d Printers Coming Soon From OVE", Jul. 17, 2014, 4 pages. https://3dprint.com/9493/ove-full-color-3d-printers/.

Xyzprinting, "Da Vinci Full Color 3D Printer", 2017, 4 pages. https://www.xyzprinting.com/en-US/product/da-vinci-color.

Z Corporation, "Setting the Standard for Fast, Affordable, Color 3D Printing", Sep. 14, 2015, 6 pages. http://www.sldtech.com/PDFs/3DPrintersBrochure_Overview.pdf.

* cited by examiner

| Printer's Printing Agent Space Coordinates | CIE L*a*b* Coordinates |
|---|---|
| 10, 5, 0, 0 | 40, 5, 20 |
| 0, 10, 10, 10 | 50, 56, -23 |
| ... | ... |
| ... | ... |

FIG. 5

| Printer's Printing Agent Space Coordinates | Printer's Native Space Coordinates |
|---|---|
| 10, 5, 0, 0 | 1, 2, 5 |
| 0, 10, 10, 10 | 5, 6, 3 |
| ... | ... |
| ... | ... |

FIG. 6

| Printer's Native RGB Space Coordinates | AdobeRGB Coordinates |
|---|---|
| 1, 2, 5 | 4, 7, 18 |
| 5, 6, 3 | 7, 8, 1 |
| ... | ... |
| ... | ... |

FIG. 7

| Three-Dimensional Printer Native Space Coordinates | Three-Dimensional Printer Printing Agent Space Coordinates |
|---|---|
| 1, 2, 5 | 10, 5, 0, 0 |
| ... | ... |
| ... | ... |
| ... | ... |

FIG. 8

| Three-Dimensional Printer Printing Agent Space Coordinates | CIE L*a*b* Coordinates |
|---|---|
| 10, 5, 0, 0 | 40, 5, 20 |
| ... | ... |
| ... | ... |
| ... | ... |

FIG. 9

| CIE L*a*b* Coordinates | Two-Dimensional Printer Printing Agent Space Coordinates |
|---|---|
| 40, 5, 20 | 8, 4, 1, 1 |
| ... | ... |
| ... | ... |
| ... | ... |

FIG. 10

| Two-Dimensional Printer Printing Agent Space Coordinates | Two-Dimensional Printer Native Space Coordinates |
|---|---|
| 8, 4, 1, 1 | 1, 2, 5 |
| ... | ... |
| ... | ... |
| ... | ... |

MAP THREE-DIMENSIONAL PRINTER NATIVE SPACE COORDINATES OF A THREE-DIMENSIONAL PRINTER TO THREE-DIMENSIONAL PRINTER PRINTING AGENT SPACE COORDINATES OF THE THREE-DIMENSIONAL PRINTER
1302

MAP, BASED ON A COLORIMETRIC MODEL FOR THE THREE-DIMENSIONAL PRINTER, THE THREE-DIMENSIONAL PRINTER PRINTING AGENT SPACE COORDINATES TO COLOR SPACE COORDINATES FOR A PREDETERMINED COLOR SPACE
1304

MAP, BASED ON A DIFFERENT COLORIMETRIC MODEL FOR A TWO-DIMENSIONAL PRINTER, THE COLOR SPACE COORDINATES TO TWO-DIMENSIONAL PRINTER PRINTING AGENT SPACE COORDINATES OF THE TWO-DIMENSIONAL PRINTER
1306

MAP THE TWO-DIMENSIONAL PRINTER PRINTING AGENT SPACE COORDINATES TO TWO-DIMENSIONAL PRINTER NATIVE SPACE COORDINATES OF THE TWO-DIMENSIONAL PRINTER TO THEREBY MAP THE THREE-DIMENSIONAL PRINTER NATIVE SPACE COORDINATES TO THE TWO-DIMENSIONAL PRINTER NATIVE SPACE COORDINATES
1308

UTILIZE, FOR THE THREE-DIMENSIONAL PRINTER AND BASED ON THE MAPPING OF THE THREE-DIMENSIONAL PRINTER NATIVE SPACE COORDINATES TO THE TWO-DIMENSIONAL PRINTER NATIVE SPACE COORDINATES, A COLOR MANAGEMENT PROTOCOL OF THE TWO-DIMENSIONAL PRINTER TO PRINT A THREE-DIMENSIONAL OBJECT
1310

THREE-DIMENSIONAL PRINTER COLOR MANAGEMENT

CLAIM FOR PRIORITY

The present application is a national stage filing under 35 U.S.C 371 of PCT application number PCT/US2017/067745, having an international filing date of Dec. 20, 2017, the disclosure of which is hereby incorporated by reference in its entirety.

BACKGROUND

In three-dimensional printing, a three-dimensional object may be formed, for example, by successively adding layers of material under computer control. Color parts of the three-dimensional object may be printed, for example, by mixing color agents. The color printing may be characterized to ensure that the printed color is the same or similar to the intended color that is to be printed.

BRIEF DESCRIPTION OF DRAWINGS

Features of the present disclosure are illustrated by way of example and not limited in the following figure(s), in which like numerals indicate like elements, in which:

FIG. 5 illustrates an example of determination of a colorimetric model to illustrate operation of the three-dimensional printer color management apparatus of FIG. 1;

FIG. 6 illustrates an example of determination of a printing agent separation map to illustrate operation of the three-dimensional printer color management apparatus of FIG. 1;

FIG. 7 illustrates an example of determination of a gamut mapping colormap or an International Color Consortium (ICC) profile lookup table to illustrate operation of the three-dimensional printer color management apparatus of FIG. 1;

FIG. 8 illustrates mapping three-dimensional printer native space coordinates of a three-dimensional printer to three-dimensional printer printing agent space coordinates of the three-dimensional printer to illustrate operation of the three-dimensional printer color management apparatus of FIG. 1 according to an example;

FIG. 9 illustrates mapping the three-dimensional printer printing agent space coordinates to color space coordinates to illustrate operation of the three-dimensional printer color management apparatus of FIG. 1 according to an example;

FIG. 10 illustrates mapping the color space coordinates to two-dimensional printer printing agent space coordinates of a two-dimensional printer to illustrate operation of the three-dimensional printer color management apparatus of FIG. 1 according to an example;

FIG. 11 illustrates mapping the two-dimensional printer printing agent space coordinates to two-dimensional printer native space coordinates of the two-dimensional printer to illustrate operation of the three-dimensional printer color management apparatus of FIG. 1 according to an example;

FIG. 13 illustrates an example flowchart of a method for three-dimensional printer color management.

DETAILED DESCRIPTION

Figure 1:
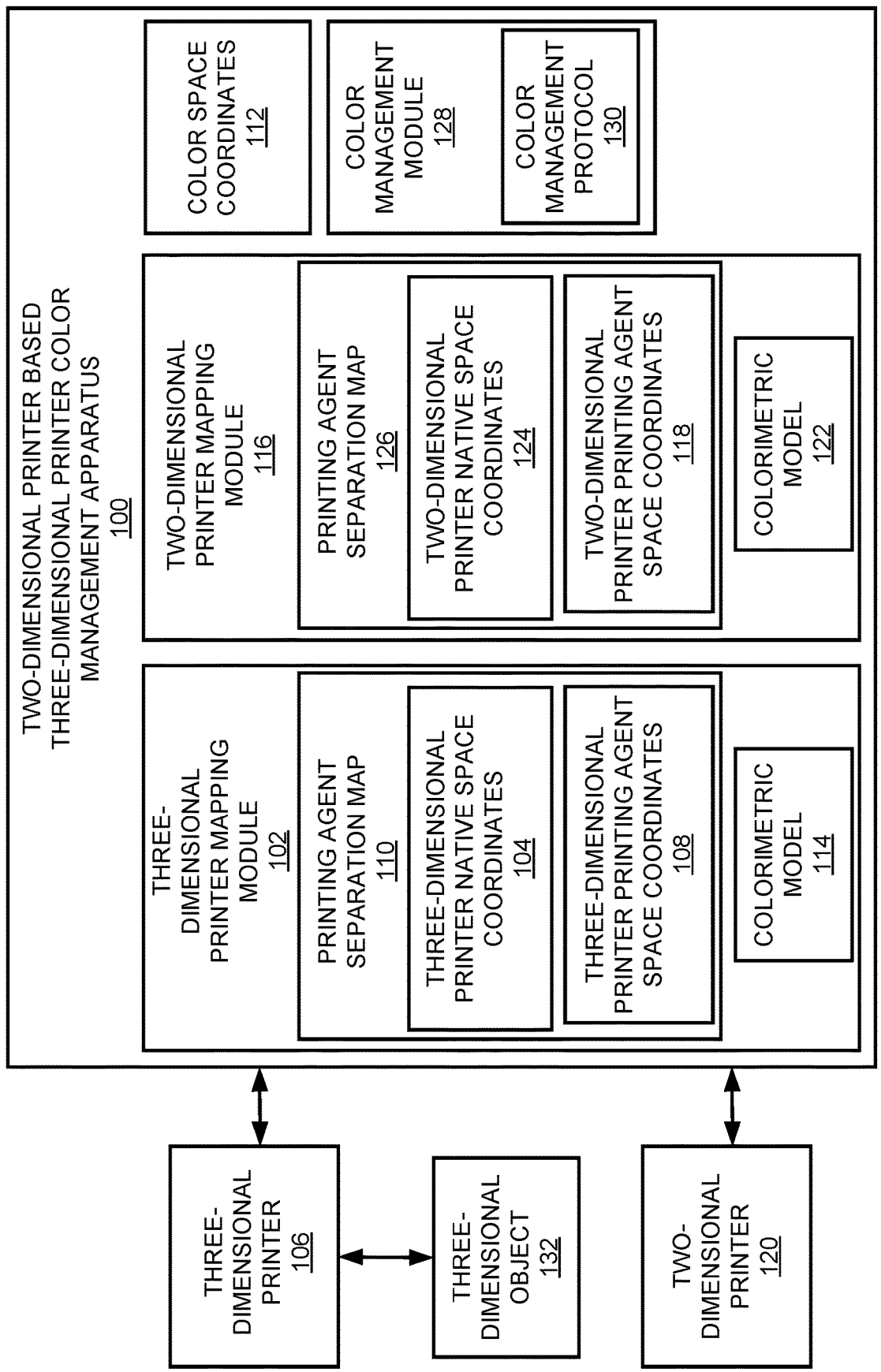
FIG. 1 illustrates an example layout of a three-dimensional printer color management apparatus, and associated components.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Three-dimensional printer color management apparatuses, methods for three-dimensional printer color management, and non-transitory computer readable media having stored thereon machine readable instructions to provide three-dimensional printer color management are disclosed herein. The apparatuses, methods, and non-transitory computer readable media disclosed herein provide for utilization of a two-dimensional printer to develop a colormap for a three-dimensional printer.

As disclosed herein, for a three-dimensional printer, color parts of a three-dimensional object may be printed by mixing color agents such as black, cyan, magenta, and yellow printing agents, and fusing agents (which may also include colored fusing agents). In order to characterize color output of the three-dimensional printer, a three-dimensional color target may be printed. Once the build of the three-dimensional color target is cooled, the printed three-dimensional color target may be extracted from the build. The printed color of the three-dimensional color target may be measured to characterize the color output of the three-dimensional printer. In order to characterize different color settings of a three-dimensional printer, a colormap that includes three-dimensional objects formed of different colors may be generated. Characterization of the color output of the three-dimensional printer based on such a colormap may take several hours. Moreover, during development of a new three-dimensional printer, several iterations of colormaps may need to be generated. Accordingly, it is technically challenging to efficiently characterize the color output of a three-dimensional printer.

The apparatuses, methods, and non-transitory computer readable media disclosed herein address at least the aforementioned technical challenges by utilizing a two-dimensional printer to develop a colormap for a three-dimensional printer. In this regard, utilization of the two-dimension printer to develop the colormap for the three-dimensional printer may reduce the time needed for developing a new iteration of a colormap for the three-dimensional printer, thus providing for additional adjustment cycles and a higher quality color output in a comparatively reduced time duration.

The apparatuses, methods, and non-transitory computer readable media disclosed herein may be utilized with any printer for printing and measuring a color target needed for color characterization of the printer.

The apparatuses, methods, and non-transitory computer readable media disclosed herein may be utilized with any printer where multiple pages of color patches may need to be generated for a fully-representative color target for color characterization of the printer. In this regard, a single-page (instead of multiple pages) color target may be used based on the approach disclosed herein.

For the apparatuses, methods, and non-transitory computer readable media disclosed herein, modules, as described herein, may be any combination of hardware and programming to implement the functionalities of the respective modules. In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates an example layout of a three-dimensional printer color management apparatus (hereinafter also referred to as "apparatus 100").

Referring to FIG. 1, the apparatus 100 may include a three-dimensional printer mapping module 102 to map three-dimensional printer native space coordinates 104 of a three-dimensional printer 106 to three-dimensional printer printing agent space coordinates 108 of the three-dimensional printer 106. According to examples, the three-dimensional printer mapping module 102 may utilize a printing agent separation map 110 for the three-dimensional printer 106 to map the three-dimensional printer native space coordinates 104 of the three-dimensional printer 106 to the three-dimensional printer printing agent space coordinates 108 of the three-dimensional printer 106.

The three-dimensional printer mapping module 102 may map the three-dimensional printer printing agent space coordinates 108 to color space coordinates 112. According to examples, the color space coordinates 112 may include universal color space coordinates that include International Commission on Illumination (CIE) L*a*b* coordinates, where L* represents lightness, a* represents color opponents green-red, and b* represents color opponents blue-yellow, or CIE XYZ coordinates, where X, Y, and Z may represent tri-estimulus values. According to examples, the three-dimensional printer mapping module 102 may utilize a colorimetric model 114 for the three-dimensional printer 106 to map the three-dimensional printer printing agent space coordinates 108 to the color space coordinates 112.

A two-dimensional printer mapping module 116 may map the color space coordinates 112 to two-dimensional printer printing agent space coordinates 118 of a two-dimensional printer 120. According to examples, the two-dimensional printer mapping module 116 may utilize a colorimetric model 122 for the two-dimensional printer 120, that is different from the colorimetric model 114 for the three-dimensional printer 106, to map the color space coordinates 112 to the two-dimensional printer printing agent space coordinates 118 of the two-dimensional printer 120.

The two-dimensional printer mapping module 116 may map the two-dimensional printer printing agent space coordinates 118 to two-dimensional printer native space coordinates 124 of the two-dimensional printer 120 to thereby map the three-dimensional printer native space coordinates 104 to the two-dimensional printer native space coordinates 124. According to examples, the two-dimensional printer mapping module 116 may utilize a printing agent separation map 126 for the two-dimensional printer 120 to map the two-dimensional printer printing agent space coordinates 118 to the two-dimensional printer native space coordinates 124 of the two-dimensional printer 120.

A color management module 128 may utilize, for the three-dimensional printer 106 and based on the mapping of the three-dimensional printer native space coordinates 104 to the two-dimensional printer native space coordinates 124, a color management protocol 130 of the two-dimensional printer 120 to print a three-dimensional object 132.

Operation of the apparatus 100 is described in further detail with reference to FIGS. 1-11.

Figure 2:
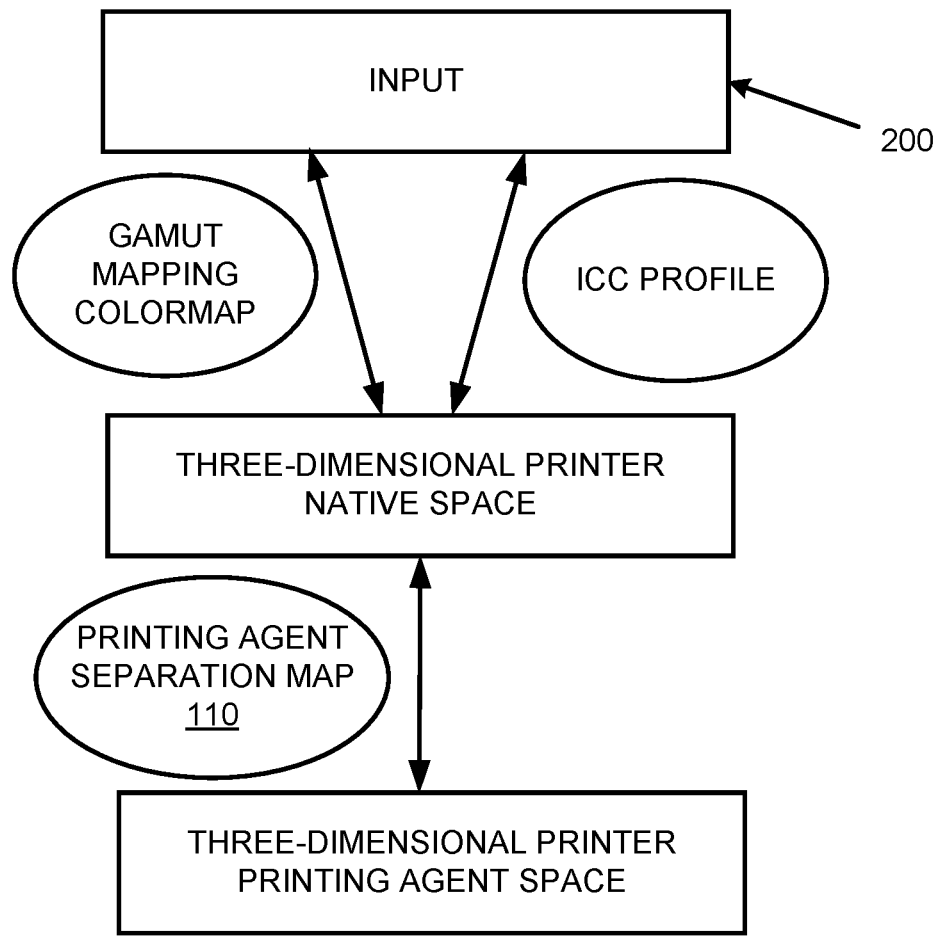
FIG. 2 illustrates an example of different levels on a printer color pipeline to illustrate operation of the three-dimensional printer color management apparatus of FIG. 1.

FIG. 2 illustrates an example of different levels on a printer color pipeline to illustrate operation of the apparatus 100.

Referring to FIG. 2, the three-dimensional printer 106 with N different printing agents (e.g., inks or color agents) may be described by an N-dimensional printing agent space. At every addressable spatial location on a print media corresponding to a pixel, or voxel in the case of the three-dimensional printer 106, one or more drops of each printing agent may be placed. The spatial distribution of these drops, and the color and unprinted area of the surrounding substrate, may determine the color of that pixel or voxel. The color output of the three-dimensional printer printing agent space, which may be, for example, four to twelve printing agents, may be particular to a printer model for the three-dimensional printer 106. The printing agent separation map 110 may be generated to provide an interface to the three-dimensional printer native space. The three-dimensional printer native space may be cyan, magenta, yellow, and key (black) CMKY, or red, green and blue (RGB). The three-dimensional printer native space may also be dependent on each printer model, and color differences between different printers may occur. In this regard, a further transformation may be used to convert the three-dimensional printer native space into an RGB or CMYK input space as shown at 200. The further transformation may be performed, for example, by a gamut mapping colormap, or an International Color Consortium (ICC) profile workflow.

Figure 3:
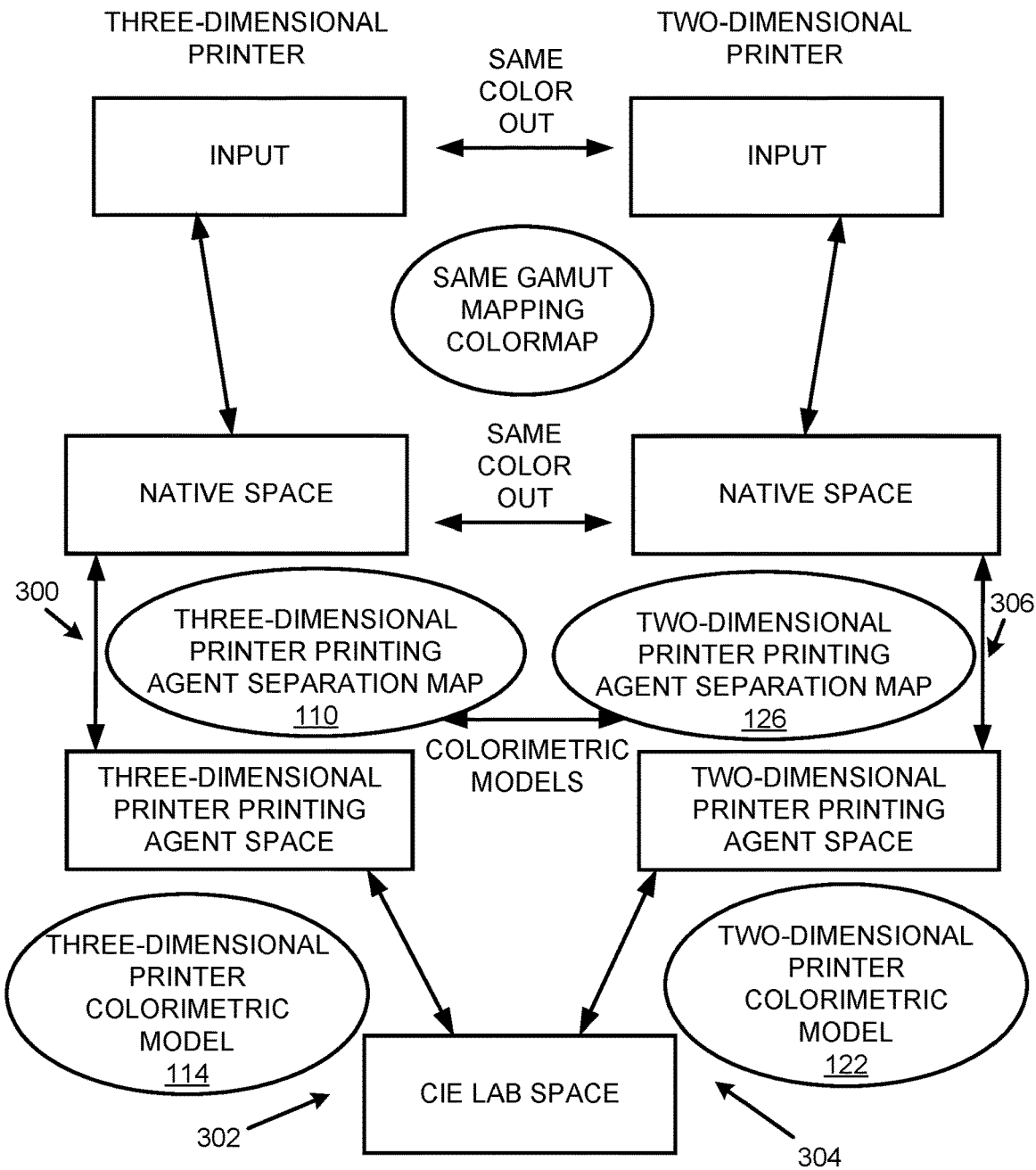
FIG. 3 illustrates an example of printer color pipelines for a three-dimensional printer and a two-dimensional printer, and their linkage through colorimetric models, to illustrate operation of the three-dimensional printer color management apparatus of FIG. 1.

FIG. 3 illustrates an example of printer color pipelines for the three-dimensional printer 106 and the two-dimensional printer 120, and their linkage through colorimetric models, to illustrate operation of the apparatus 100.

Referring to FIG. 3, as disclosed herein, the three-dimensional printer mapping module 102 may utilize the colorimetric model 114 for the three-dimensional printer 106 to map the three-dimensional printer printing agent space coordinates 108 to the color space coordinates 112. In this regard, the three-dimensional printer mapping module 102 may also generate the colorimetric model 114. Further, as disclosed herein, the two-dimensional printer mapping module 116 may utilize the colorimetric model 122 for the two-dimensional printer 120, that is different from the colorimetric model 114 for the three-dimensional printer 106, to map the color space coordinates 112 to the two-dimensional printer printing agent space coordinates 118 of the two-dimensional printer 120. In this regard, the two-dimensional printer mapping module 116 may also generate the colorimetric model 122.

The colorimetric model may be described as a model that relates each value in a printer's printing agent space to a colorimetric measurement in a colorimetric space (e.g., CIE L*a*b*, for example, that includes the color space coordinates 112 as shown in FIG. 3). This relationship may be bidirectional for the three-dimensional printer 106 and the two-dimensional printer 120, and may thus be used to generate a bidirectional look-up table (LUT) relating the amounts of the primary printing agents in the three-dimensional printer 106 to the primary printing agents in the two-dimensional printer 120 that produce the same color output. By using this bidirectional look-up table, the three-dimensional printer printing agent separation map 110 may be designed on the three-dimensional printer 106 to comply with all the color specifications, and then transformed to the three-dimensional printer 106 primary printing agent values. Hence, the three-dimensional printer native space may be equal to the two-dimensional printer 120 native space, which thus allows the gamut mapping colormaps or ICC profiles built on the two-dimensional printer 120 to be used without any transformations, directly on the three-dimensional printer 106.

The colorimetric model 114 for the three-dimensional printer 106 and the colorimetric model 122 for the two-dimensional printer 120 may be generated as follows.

Figure 4:
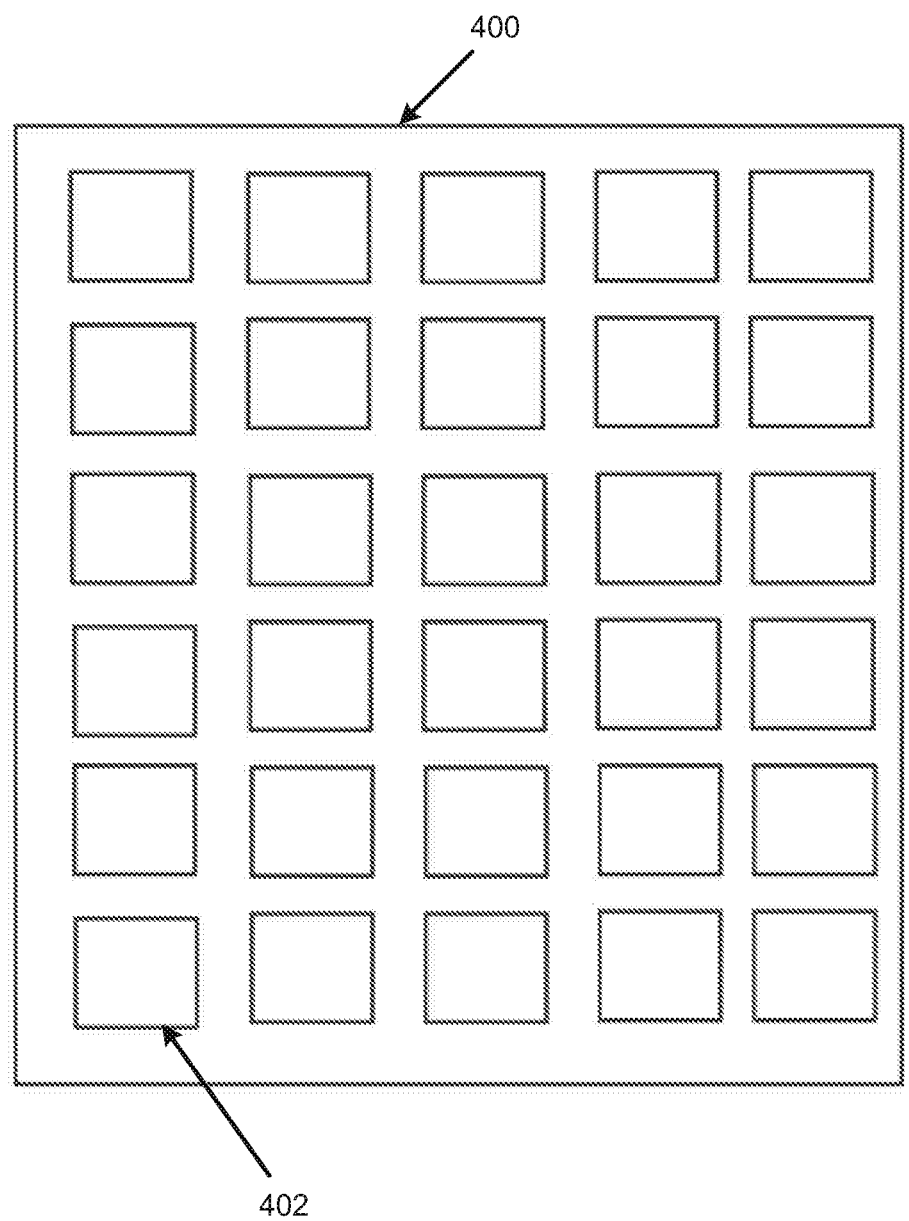
FIG. 4 illustrates an example of a color target including thirty color patches to illustrate operation of the three-dimensional printer color management apparatus of FIG. 1.

A color target (e.g., as shown in FIG. 4) may be designed and built for the three-dimensional printer 106 and the two-dimensional printer 120. Each color target may be designed in the printing agent space of the corresponding printer. Hence, the color target for three-dimensional printer 106 may include information about the agents (e.g., four printing agents, two fusing agents) affecting color. In the case of the two-dimensional printer 120, a four printing agent system may be used. The color target for three-dimensional printer 106 may be designed by considering the restrictions on the amounts of each agents that may be mixed.

Both color targets (e.g., for the three-dimensional printer 106 and the two-dimensional printer 120) may be measured, for example, by using a colorimeter, spectrophotometer, or another such instrument. In this regard, CIE L*a*b* values may be used. Each color patch (e.g., each square section of FIG. 4) measured in the color target may be denoted a "node" in the corresponding colorimetric or printing agent space.

For each printer (e.g., the three-dimensional printer 106 and the two-dimensional printer 120), two functions may be generated.

One function may take the printing agent space coordinates as input (e.g., four-dimensional for the two-dimensional printer 120, and six-dimensional for three-dimensional printer 106), and generate a CIE L*a*b* value as output. This function may be generated, for example, based on a Delaunay segmentation of the printer's printing agent space, using the aforementioned measured nodes. The input requested may be located inside the Delaunay simplex containing it, and distances to each of the nodes of that simplex may be determined. These distances may be used to linearly interpolate the node values in CIE L*a*b* space, and to produce an estimated CIE L*a*b* output.

The second function may take the CIE L*a*b* coordinates as input (e.g., three-dimensional input), and generate a printing agent space value as output. In this case, given the lower dimensionality of the input space, spline interpolation or other such techniques may be used.

As shown in FIG. 3, the aforementioned first and second functions may be concatenated for both printers (e.g., the three-dimensional printer 106 and the two-dimensional printer 120) to establish a bidirectional relationship between the two printing agent spaces based on the aforementioned colorimetric models (e.g., the colorimetric model 114 and the colorimetric model 122).

Accordingly, any change to the printing agent space of the three-dimensional printer 106 may be translated to produce the same output in the printing agent space of the two-dimensional printer 120. As a result, the colorimetric equivalence between both native spaces of the three-dimensional printer 106 and the two-dimensional printer 120 may be maintained. In this regard, the colorimetric equivalence may provide for conservation of the interchangeability of gamut mapping colormaps and ICC profiles. Moreover, inversely, any change implemented in the two-dimensional printer 120 printing agent space during the research and development of color resources may be translated into the three-dimensional printer 106 printing agent space, without the need to print a three-dimensional part.

FIG. 4 illustrates an example of a color target including thirty color patches to illustrate operation of the apparatus 100.

Referring to FIG. 4, the color target 400 may be printed, for example, on paper for a two-dimensional printer, or three-dimensional printing material for a three-dimensional printer. For the example of FIG. 4, the color target 400 may include thirty color patches. However any number of color patches may be utilized. Each color patch may be printed using specific printing agent amounts. For example, color patch 402 may be printed using specific printing agent amounts from the printing agent set KCMY, where K=10, C=5, M=0, Y=0 in specified printing agent volume units. Each color patch may be measured with an instrument such as a colorimeter or spectrophotometer. This measurement may provide color coordinates of that patch in a universally specified color space (for example CIE L*a*b* space), where L*=40, a*=5, b*=20.

FIG. 5 illustrates an example of determination of a colorimetric model to illustrate operation of the apparatus 100.

Referring to FIG. 5, for the example of FIG. 4, the colorimetric model 114 for the three-dimensional printer 106 may be built to include the three-dimensional printer printing agent space coordinates 108 and the corresponding CIE L*a*b* space. By using interpolation techniques based, for example, on Delaunay tessellation, an accurate colorimetric estimation (e.g., the values of second column in the table of FIG. 5) for any input combination (e.g., the first column of the table of FIG. 5) of printer's printing agents, and vice-versa to thus include bidirectionality, may be determined. The colorimetric model 122 for the two-dimensional printer 120 may be similarly generated.

FIG. 6 illustrates an example of determination of a printing agent separation map to illustrate operation of the apparatus 100.

Referring to FIG. 6, with respect to generation of the printing agent separation map 110 for the three-dimensional printer 106, and the printing agent separation map 126 for the two-dimensional printer 120, printing agent amounts may be described as coordinates in printing agent space. For the printing agent space, the dimension N may be equal to the number of printing agents in the printer, which may be from four to twelve (or greater). When N is equal to four, the printing agents may include printing agents such as cyan, magenta, yellow, and black.

With respect to the printing agent separation map 110 and the printing agent separation map 126, for a printer's printing agent space, in a printer with N printing agents, any N-tuple combination of numbers representing printing agent amounts in certain units may be considered as the coordinates of a printable color. The combination of all printable colors' coordinates (e.g., all possible I-dimensional combinations) may be described as the printing agent space.

With respect to the printing agent separation map 110 and the printing agent separation map 126, a printer's native space may generally include three or four dimensions to provide a user-friendly interface to a printer. If three dimensions are used, this space may be denoted "printer's native RGB space". If four dimensions are used, this space may be denoted "printer's native CMYK space".

With respect to the printing agent separation map 110 and the printing agent separation map 126, a printing agent separation map may be described as a table relating printing agent amounts (coordinates in the printing agent space) to coordinates in the native space for a printer. For example, in a printer with four printing agents, and a RGB native space, as shown in FIG. 6, the printing agent separation map 110 (and similarly the printing agent separation map 126) may include the three-dimensional printer printing agent space coordinates 108 mapped to the three-dimensional printer native space coordinates 104.

FIG. 7 illustrates an example of determination of a gamut mapping colormap or an International Color Consortium (ICC) profile lookup table to illustrate operation of the apparatus 100.

Referring to FIG. 7, with respect to gamut mapping colormap or an ICC profile lookup table, these tables may relate the native space for a printer to color spaces which may include three or four dimensions (e.g., standard Red Green Blue (sRGB), AdobeRGB, U.S. Web Coated (SWOP)-CMYK, etc.). For example, in a printer with a native space being RGB, a colormap to AdobeRGB mapping may be implemented as shown in FIG. 7.

FIG. 8 illustrates mapping three-dimensional printer native space coordinates of a three-dimensional printer to three-dimensional printer printing agent space coordinates of the three-dimensional printer to illustrate operation of the apparatus 100.

The mapping disclosed herein with respect to FIGS. 8-11 may be based on making every possible combination of coordinates in the two-dimensional printer 120 native space to include the same color (i.e., with the same CIE L*a*b* coordinates) as the same combination of coordinates in three-dimensional printer 106 native space. In this regard, referring to FIGS. 3 and 8, at location 300 of FIG. 3, the three-dimensional printer mapping module 102 may utilize the printing agent separation map 110 for the three-dimensional printer 106 to map the three-dimensional printer native space coordinates 104 of the three-dimensional printer 106 to the three-dimensional printer printing agent space coordinates 108 of the three-dimensional printer 106. The resulting mapping for the examples of FIGS. 4-7 is shown in abbreviated format in FIG. 8.

FIG. 9 illustrates mapping the three-dimensional printer printing agent space coordinates to color space coordinates to illustrate operation of the apparatus 100.

Referring to FIGS. 3 and 9, at location 302 of FIG. 3, the three-dimensional printer mapping module 102 may utilize the colorimetric model 114 for the three-dimensional printer 106 to map the three-dimensional printer printing agent space coordinates 108 to the color space coordinates 112. The resulting mapping for the examples of FIGS. 4-8 is shown in abbreviated format in FIG. 9.

FIG. 10 illustrates mapping the color space coordinates to two-dimensional printer printing agent space coordinates of a two-dimensional printer to illustrate operation of the apparatus 100.

Referring to FIGS. 3 and 10, at location 304 of FIG. 3, the two-dimensional printer mapping module 116 may utilize the colorimetric model 122 for the two-dimensional printer 120, that is different from the colorimetric model 114 for the three-dimensional printer 106, to map the color space coordinates 112 to the two-dimensional printer printing agent space coordinates 118 of the two-dimensional printer 120. The resulting mapping for the examples of FIGS. 4-9 is shown in abbreviated format in FIG. 10.

FIG. 11 illustrates mapping the two-dimensional printer printing agent space coordinates to two-dimensional printer native space coordinates of the two-dimensional printer to illustrate operation of the apparatus 100.

Referring to FIG. 11, at location 306 of FIG. 3, the two-dimensional printer mapping module 116 may utilize the printing agent separation map 126 for the two-dimensional printer 120 to map the two-dimensional printer printing agent space coordinates 118 to the two-dimensional printer native space coordinates 124 of the two-dimensional printer 120. The resulting mapping for the examples of FIGS. 4-10 is shown in abbreviated format in FIG. 11.

Figure 12:
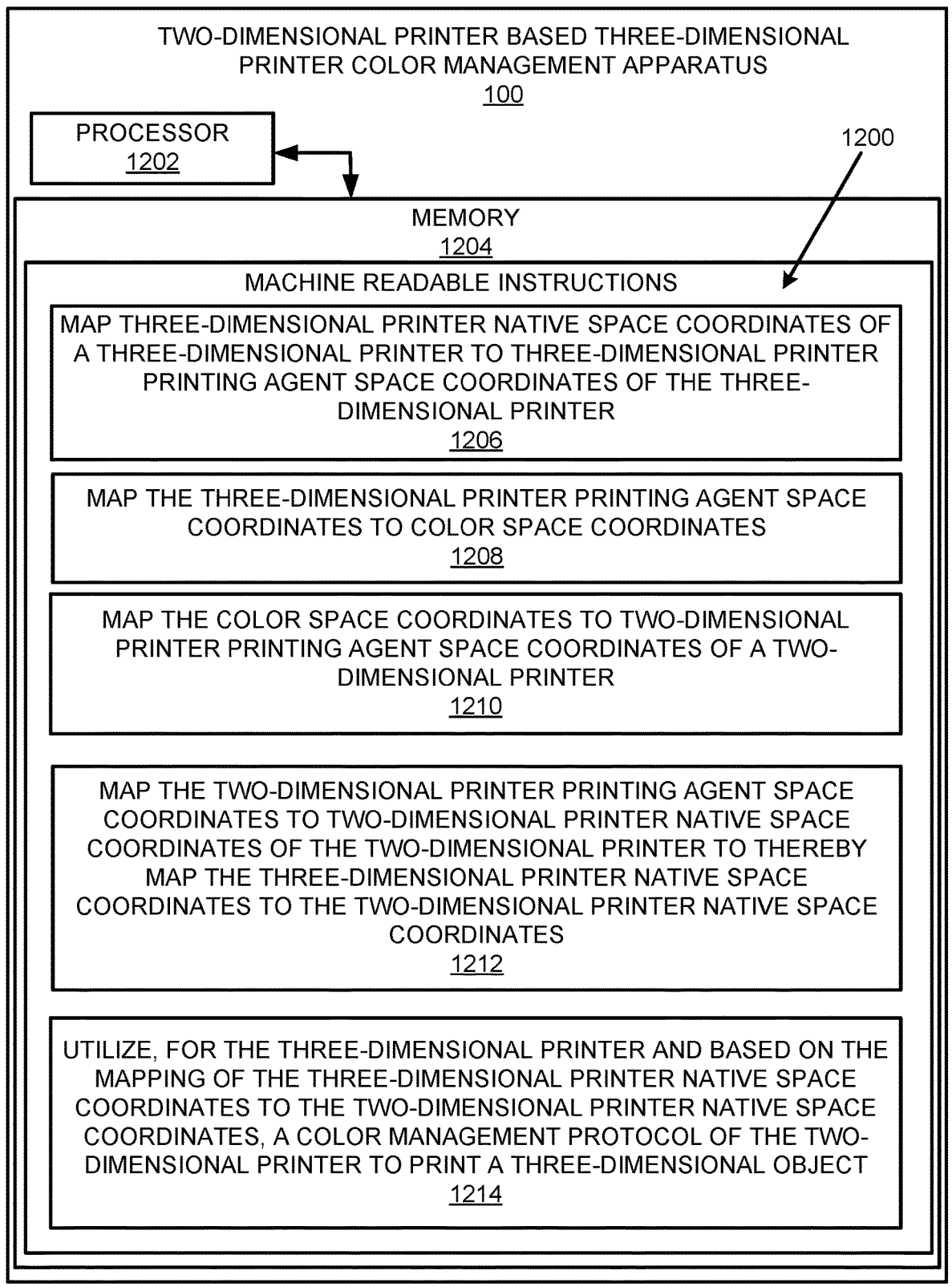
FIG. 12 illustrates an example block diagram for three-dimensional printer color management.
Figure 14:
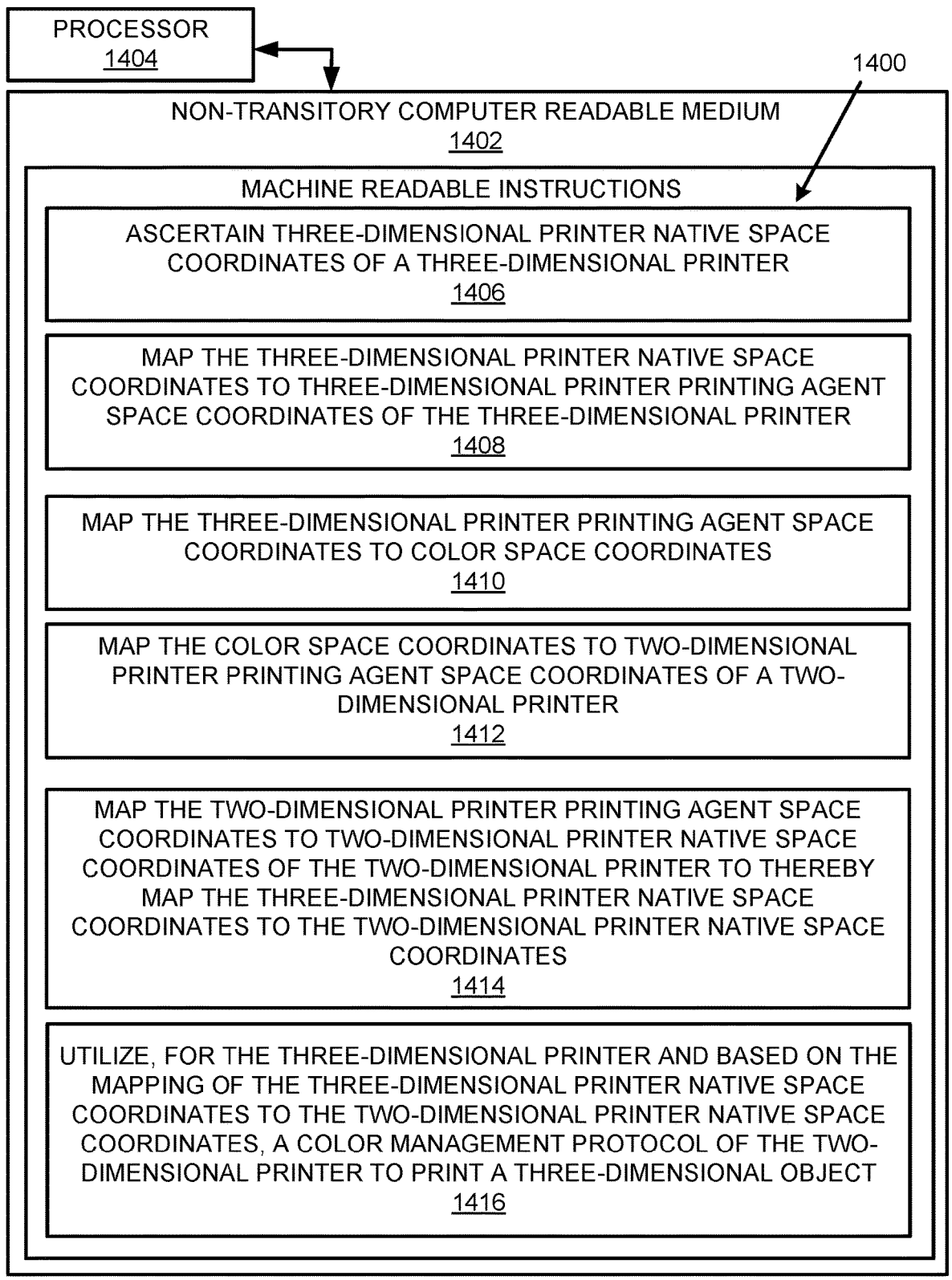
FIG. 14 illustrates a further example block diagram for three-dimensional printer color management.

FIGS. 12-14 respectively illustrate an example block diagram 1200, an example flowchart of a method 1300, and a further example block diagram 1400 for three-dimensional printer color management. The block diagram 1200, the method 1300, and the block diagram 1400 may be implemented on the apparatus 100 described above with reference to FIG. 1 by way of example and not limitation. The block diagram 1200, the method 1300, and the block diagram 1400 may be practiced in other apparatus. In addition to showing the block diagram 1200, FIG. 12 shows hardware of the apparatus 100 that may execute the instructions of the block diagram 1200. The hardware may include a processor 1202, and a memory 1204 (i.e., a non-transitory computer readable medium) storing machine readable instructions that when executed by the processor 1202 cause the processor to perform the instructions of the block diagram 1200. The memory 1204 may represent a non-transitory computer readable medium. FIG. 13 may represent a method for three-dimensional printer color management, and the steps of the method. FIG. 14 may represent a non-transitory computer readable medium 1402 having stored thereon machine readable instructions to provide three-dimensional printer color management. The machine readable instructions, when executed, cause a processor 1404 to perform the instructions of the block diagram 1400 also shown in FIG. 14.

The processor 1202 of FIG. 12 and/or the processor 1404 of FIG. 14 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1402 of FIG. 14), such as hardware storage devices (e.g., RAM (random access memory), ROM (read only memory), EPROM (erasable, programmable ROM), EEPROM (electrically erasable, programmable ROM), hard drives, and flash memory). The memory 1204 may include a RAM, where the machine readable instructions and data for a processor may reside during runtime.

Referring to FIGS. 1-12, and particularly to the block diagram 1200 shown in FIG. 12, the memory 1204 may include instructions 1206 to map three-dimensional printer native space coordinates 104 of a three-dimensional printer 106 to three-dimensional printer printing agent space coordinates 108 of the three-dimensional printer 106.

The processor 1202 may fetch, decode, and execute the instructions 1208 to map the three-dimensional printer printing agent space coordinates 108 to color space coordinates 112.

The processor 1202 may fetch, decode, and execute the instructions 1210 to map the color space coordinates 112 to two-dimensional printer printing agent space coordinates 118 of a two-dimensional printer 120.

The processor 1202 may fetch, decode, and execute the instructions 1212 to map the two-dimensional printer printing agent space coordinates 118 to two-dimensional printer native space coordinates 124 of the two-dimensional printer 120 to thereby map the three-dimensional printer native space coordinates 104 to the two-dimensional printer native space coordinates 124.

The processor 1202 may fetch, decode, and execute the instructions 1214 to utilize, for the three-dimensional printer 106 and based on the mapping of the three-dimensional printer native space coordinates 104 to the two-dimensional printer native space coordinates 124, a color management protocol 130 of the two-dimensional printer 120 to print a three-dimensional object 132.

Referring to FIGS. 1-11 and 13, and particularly FIG. 13, for the method 1300, at block 1302, the method may include mapping three-dimensional printer native space coordinates 104 of a three-dimensional printer 106 to three-dimensional printer printing agent space coordinates 108 of the three-dimensional printer 106.

At block 1304 the method may include mapping, based on a colorimetric model 114 for the three-dimensional printer 106, the three-dimensional printer printing agent space coordinates 108 to color space coordinates 112 for a predetermined color space.

At block 1306 the method may include mapping, based on a different colorimetric model 122 for a two-dimensional printer 120, the color space coordinates 112 to two-dimensional printer printing agent space coordinates 118 of the two-dimensional printer 120.

At block 1308 the method may include mapping the two-dimensional printer printing agent space coordinates 118 to two-dimensional printer native space coordinates 124 of the two-dimensional printer 120 to thereby map the three-dimensional printer native space coordinates 104 to the two-dimensional printer native space coordinates 124.

At block 1310 the method may include utilizing, for the three-dimensional printer 106 and based on the mapping of the three-dimensional printer native space coordinates 104 to the two-dimensional printer native space coordinates 124, a color management protocol 130 of the two-dimensional printer 120 to print a three-dimensional object 132.

Referring to FIGS. 1-11 and 14, and particularly FIG. 14, for the block diagram 1400, the non-transitory computer readable medium 1402 may include instructions 1406 to ascertain three-dimensional printer native space coordinates 104 of a three-dimensional printer 106.

The processor 1404 may fetch, decode, and execute the instructions 1408 to map the three-dimensional printer native space coordinates 104 to three-dimensional printer printing agent space coordinates 108 of the three-dimensional printer 106.

The processor 1404 may fetch, decode, and execute the instructions 1410 to map the three-dimensional printer printing agent space coordinates 108 to color space coordinates 112.

The processor 1404 may fetch, decode, and execute the instructions 1412 to map the color space coordinates 112 to two-dimensional printer printing agent space coordinates 118 of a two-dimensional printer 120.

The processor 1404 may fetch, decode, and execute the instructions 1414 to map the two-dimensional printer printing agent space coordinates 118 to two-dimensional printer native space coordinates 124 of the two-dimensional printer 120 to thereby map the three-dimensional printer native space coordinates 104 to the two-dimensional printer native space coordinates 124.

The processor 1404 may fetch, decode, and execute the instructions 1416 to utilize, for the three-dimensional printer 106 and based on the mapping of the three-dimensional printer native space coordinates 104 to the two-dimensional printer native space coordinates 124, a color management protocol 130 of the two-dimensional printer 120 to print a three-dimensional object 132.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
a processor; and
a non-transitory computer readable medium storing machine readable instructions that when executed by the processor cause the processor to:
map three-dimensional printer native space coordinates of a three-dimensional printer to three-dimensional printer printing agent space coordinates of the three-dimensional printer;
map the three-dimensional printer printing agent space coordinates to color space coordinates;
map the color space coordinates to two-dimensional printer printing agent space coordinates of a two-dimensional printer;
map the two-dimensional printer printing agent space coordinates to two-dimensional printer native space coordinates of the two-dimensional printer to thereby map the three-dimensional printer native space coordinates to the two-dimensional printer native space coordinates; and
utilize, for the three-dimensional printer and based on the mapping of the three-dimensional printer native space coordinates to the two-dimensional printer native space coordinates, a color management protocol of the two-dimensional printer to print a three-dimensional object.

2. The apparatus according to claim 1, wherein the color space coordinates include universal color space coordinates that include CIE L*a*b* coordinates, where L* represents lightness, a* represents color opponents green-red, and b* represents color opponents blue-yellow, or CIE XYZ coordinates, where X, Y, and Z represent tri-estimulus values.

3. The apparatus according to claim 1, wherein the instructions to map the three-dimensional printer native space coordinates of the three-dimensional printer to the three-dimensional printer printing agent space coordinates of the three-dimensional printer are further to cause the processor to:
utilize a printing agent separation map for the three-dimensional printer to map the three-dimensional printer native space coordinates of the three-dimensional printer to the three-dimensional printer printing agent space coordinates of the three-dimensional printer.

4. The apparatus according to claim 1, wherein the instructions to map the three-dimensional printer printing agent space coordinates to the color space coordinates are further to cause the processor to:
utilize a colorimetric model for the three-dimensional printer to map the three-dimensional printer printing agent space coordinates to the color space coordinates.

5. The apparatus according to claim 4, wherein the instructions to map the color space coordinates to the two-dimensional printer printing agent space coordinates of the two-dimensional printer are further to cause the processor to:
utilize a colorimetric model for the two-dimensional printer, that is different from the colorimetric model for the three-dimensional printer, to map the color space coordinates to the two-dimensional printer printing agent space coordinates of the two-dimensional printer.

6. The apparatus according to claim 1, wherein the instructions to map the color space coordinates to the two-dimensional printer printing agent space coordinates of the two-dimensional printer are further to cause the processor to:
utilize a colorimetric model for the two-dimensional printer to map the color space coordinates to the two-dimensional printer printing agent space coordinates of the two-dimensional printer.

7. The apparatus according to claim 1, wherein the instructions to map the two-dimensional printer printing agent space coordinates to the two-dimensional printer native space coordinates of the two-dimensional printer are further to cause the processor to:
utilize a printing agent separation map for the two-dimensional printer to map the two-dimensional printer printing agent space coordinates to the two-dimensional printer native space coordinates of the two-dimensional printer.

8. A computer implemented method comprising:
mapping three-dimensional printer native space coordinates of a three-dimensional printer to three-dimensional printer printing agent space coordinates of the three-dimensional printer;
mapping, based on a colorimetric model for the three-dimensional printer, the three-dimensional printer printing agent space coordinates to color space coordinates for a predetermined color space;
mapping, based on a different colorimetric model for a two-dimensional printer, the color space coordinates to two-dimensional printer printing agent space coordinates of the two-dimensional printer;
mapping the two-dimensional printer printing agent space coordinates to two-dimensional printer native space coordinates of the two-dimensional printer to thereby map the three-dimensional printer native space coordinates to the two-dimensional printer native space coordinates; and
utilizing, for the three-dimensional printer and based on the mapping of the three-dimensional printer native space coordinates to the two-dimensional printer native space coordinates, a color management protocol of the two-dimensional printer to print a three-dimensional object.

9. The method according to claim 8, wherein the color space coordinates for the predetermined color space include universal color space coordinates that include CIE L*a*b* coordinates, where L* represents lightness, a* represents color opponents green-red, and b* represents color opponents blue-yellow, or CIE XYZ coordinates, where X, Y, and Z represent tri-estimulus values.

10. The method according to claim 8, wherein mapping the three-dimensional printer native space coordinates of the three-dimensional printer to the three-dimensional printer printing agent space coordinates of the three-dimensional printer further comprises:
utilizing a printing agent separation map for the three-dimensional printer to map the three-dimensional printer native space coordinates of the three-dimensional printer to the three-dimensional printer printing agent space coordinates of the three-dimensional printer.

11. The method according to claim 8, wherein mapping the two-dimensional printer printing agent space coordinates to the two-dimensional printer native space coordinates of the two-dimensional printer further comprises:
utilizing a printing agent separation map for the two-dimensional printer to map the two-dimensional printer printing agent space coordinates to the two-dimensional printer native space coordinates of the two-dimensional printer.

12. A non-transitory computer readable medium having stored thereon machine readable instructions, the machine readable instructions, when executed, cause a processor to:
ascertain three-dimensional printer native space coordinates of a three-dimensional printer;
map the three-dimensional printer native space coordinates to three-dimensional printer printing agent space coordinates of the three-dimensional printer;
map the three-dimensional printer printing agent space coordinates to color space coordinates;
map the color space coordinates to two-dimensional printer printing agent space coordinates of a two-dimensional printer;
map the two-dimensional printer printing agent space coordinates to two-dimensional printer native space coordinates of the two-dimensional printer to thereby map the three-dimensional printer native space coordinates to the two-dimensional printer native space coordinates; and
utilize, for the three-dimensional printer and based on the mapping of the three-dimensional printer native space coordinates to the two-dimensional printer native space coordinates, a color management protocol of the two-dimensional printer to print a three-dimensional object.

13. The non-transitory computer readable medium according to claim 12, wherein the color space coordinates include universal color space coordinates that include CIE L*a*b* coordinates, where L* represents lightness, a* represents color opponents green-red, and b* represents color opponents blue-yellow, or CIE XYZ coordinates, where X, Y, and Z represent tri-estimulus values.

14. The non-transitory computer readable medium according to claim 12, wherein the machine readable instructions to map the three-dimensional printer native space coordinates to the three-dimensional printer printing agent space coordinates of the three-dimensional printer, when executed, further cause the processor to:

utilize a printing agent separation map for the three-dimensional printer to map the three-dimensional printer native space coordinates to the three-dimensional printer printing agent space coordinates of the three-dimensional printer.

15. The non-transitory computer readable medium according to claim 12, wherein the machine readable instructions to map the two-dimensional printer printing agent space coordinates to the two-dimensional printer native space coordinates of the two-dimensional printer, when executed, further cause the processor to:

utilize a printing agent separation map for the two-dimensional printer to map the two-dimensional printer printing agent space coordinates to the two-dimensional printer native space coordinates of the two-dimensional printer.

\* \* \* \* \*